United States Patent
Mehmood et al.

(10) Patent No.: US 11,976,548 B2
(45) Date of Patent: May 7, 2024

(54) SONIC WAVES FOR CONTINUOUS PRESSURE LOGGING DURING FALLOFF TEST

(71) Applicant: Saudi Arabian Oil Company, Dhahran (SA)

(72) Inventors: Sajid Mehmood, Udhailyah (SA); Muhannad Alabdullateef, Al Khubar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/745,572

(22) Filed: May 16, 2022

(65) Prior Publication Data
US 2023/0366310 A1    Nov. 16, 2023

(51) Int. Cl.
*E21B 47/047* (2012.01)
*E21B 34/02* (2006.01)
*E21B 47/06* (2012.01)
*G01F 23/2962* (2022.01)

(52) U.S. Cl.
CPC ............ *E21B 47/047* (2020.05); *E21B 34/02* (2013.01); *E21B 47/06* (2013.01); *G01F 23/2962* (2013.01)

(58) Field of Classification Search
CPC ........ E21B 47/06; E21B 34/02; E21B 47/047; G01F 23/2962
See application file for complete search history.

(56) References Cited

U.S. PATENT DOCUMENTS

| | | | | |
|---|---|---|---|---|
| 5,285,388 A | * | 2/1994 | McCoy | G01F 23/2962 367/113 |
| 5,555,945 A | * | 9/1996 | Schultz | E21B 33/1243 166/250.07 |
| 5,743,334 A | * | 4/1998 | Nelson | E21B 49/008 166/250.1 |
| 11,613,957 B1 | * | 3/2023 | Zahur | E21B 33/127 166/305.1 |
| 2017/0183963 A1 | * | 6/2017 | Al-Dosary | E21B 47/06 |
| 2017/0234121 A1 | * | 8/2017 | Anisur Rahman | E21B 49/008 166/250.07 |
| 2020/0386073 A1 | * | 12/2020 | Joubran | E21B 34/08 |

OTHER PUBLICATIONS

APG, "IRU-3430 Ultrasonic Level Sensor," Datasheet, APG Sensors, Aug. 2015, 4 pages.
apgsensors.com [online], "Long Range Ultrasonic Level Sensor: 50 Feet," 2020, retrieved May 3, 2022, retrieved from URL <https://www.apgsensors.com/ultrasonic-level-sensors/long-range-ultrasonic-level-sensor-50-feet>, 6 pages.

* cited by examiner

Primary Examiner — Brad Harcourt
(74) Attorney, Agent, or Firm — Fish & Richardson P.C.

(57) ABSTRACT

A method and a system for determining reservoir pressure in a wellbore during a falloff test are provided. An exemplary method includes shutting in a wellbore, measuring pressure versus time using a wellhead sensor, calculating a reservoir pressure versus time from the measured pressure, and determining if the measured pressure has dropped to zero. If the measured pressure has dropped to zero, measuring distance from the wellhead sensor to a liquid level versus time, calculating a vertical depth versus time from the distance versus time, and calculating the reservoir pressure versus time based, at least in part, on the distance and the vertical depth of the well. The method also includes creating a falloff curve from the reservoir pressure versus time and providing the falloff curve.

18 Claims, 7 Drawing Sheets

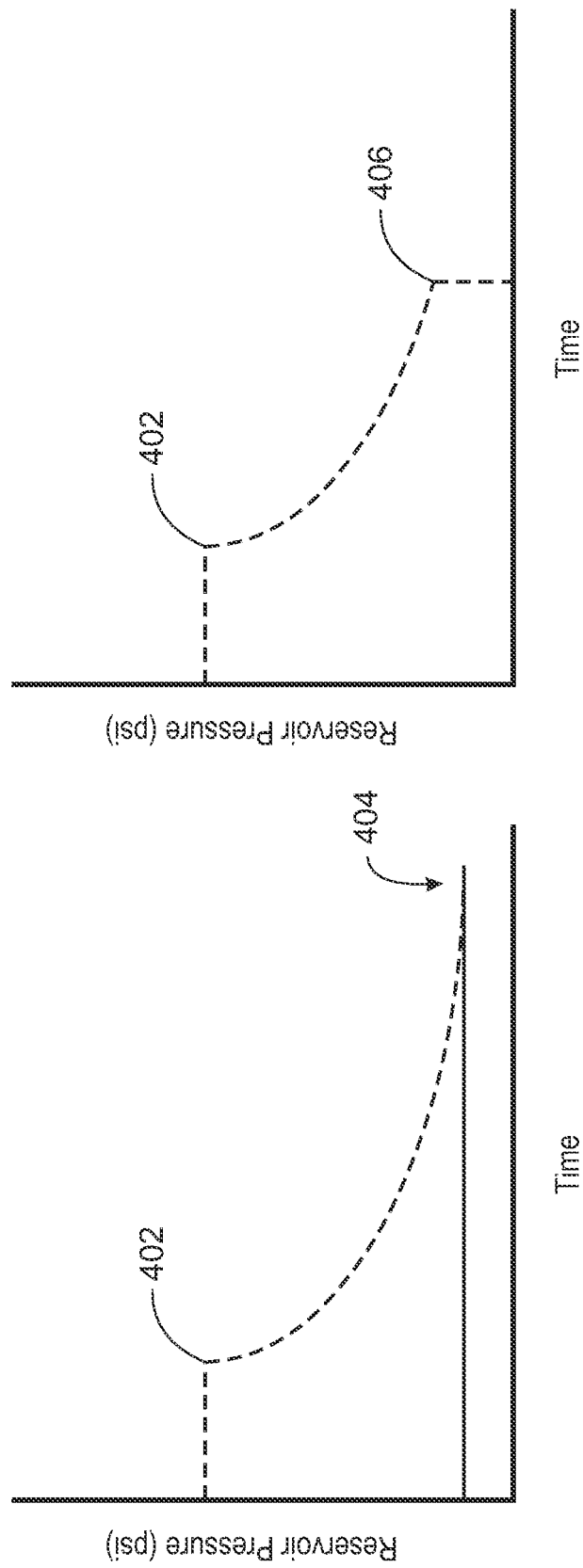

SONIC WAVES FOR CONTINUOUS PRESSURE LOGGING DURING FALLOFF TEST

TECHNICAL FIELD

The present disclosure is directed to acquiring pressure data necessary to conduct a falloff test using both a pressure sensor and a sonic level sensor.

BACKGROUND

A falloff test gauges the health of a reservoir by monitoring a pressure drop when a wellbore is blocked in, for example, after stopping an injection. The falloff test provides insights on various properties like skin damage, nearby fracture, regional permeability, and formation pressure. The test may be performed by recording the pressure from the wellhead or downhole. However, if the liquid level drops below the pressure gauge, the pressure cannot be recorded.

SUMMARY

An embodiment described in examples herein provides a method for determining reservoir pressure in a wellbore during a falloff test. The method includes shutting in a wellbore, measuring pressure versus time using a wellhead sensor, calculating a reservoir pressure versus time from the measured pressure, and determining if the measured pressure has dropped to zero. If the measured pressure has dropped to zero, measuring distance from the wellhead sensor to a liquid level versus time, calculating a vertical depth versus time from the distance versus time, and calculating the reservoir pressure versus time based, at least in part, on the distance and the vertical depth of the well. The method also includes creating a falloff curve from the reservoir pressure versus time and providing the falloff curve.

Another embodiment described in examples herein provides a system for measuring pressure in a wellbore during a falloff test. The system includes a pressure sensor disposed at a surface in a wellbore, a sonic sensor disposed at the surface in the wellbore proximate to the pressure sensor, and a controller. The controller includes a sensor interface to couple the controller to the pressure sensor and the sonic sensor, a processor, and a data store. The data store includes instructions to direct the processor to measure the pressure from the pressure sensor, measure a level of fluid in the wellbore using the sonic sensor, calculate the reservoir pressure using the pressure, or the pressure and the level, generate a falloff plot, and provide the falloff plot.

BRIEF DESCRIPTION OF DRAWINGS

FIGS. 4A-4C are plots of the pressure measurement during a falloff test in the wellbore using data from level measurements to provide a continuous measurement of the reservoir pressure after the liquid level falls below the surface pressure gauge.

DETAILED DESCRIPTION

Techniques for producing a continuous pressure log are provided. The pressure measurement from a surface, or wellhead, pressure gauge is collected until the liquid level drops below the wellhead pressure gauge. A sonic wave generator and sensors is then used to accurately determine the water level when it falls below the wellhead surface pressure gauges. The pressure is then calculated from the height of the hydrostatic column utilizing the water level measurements.

Figure 1:
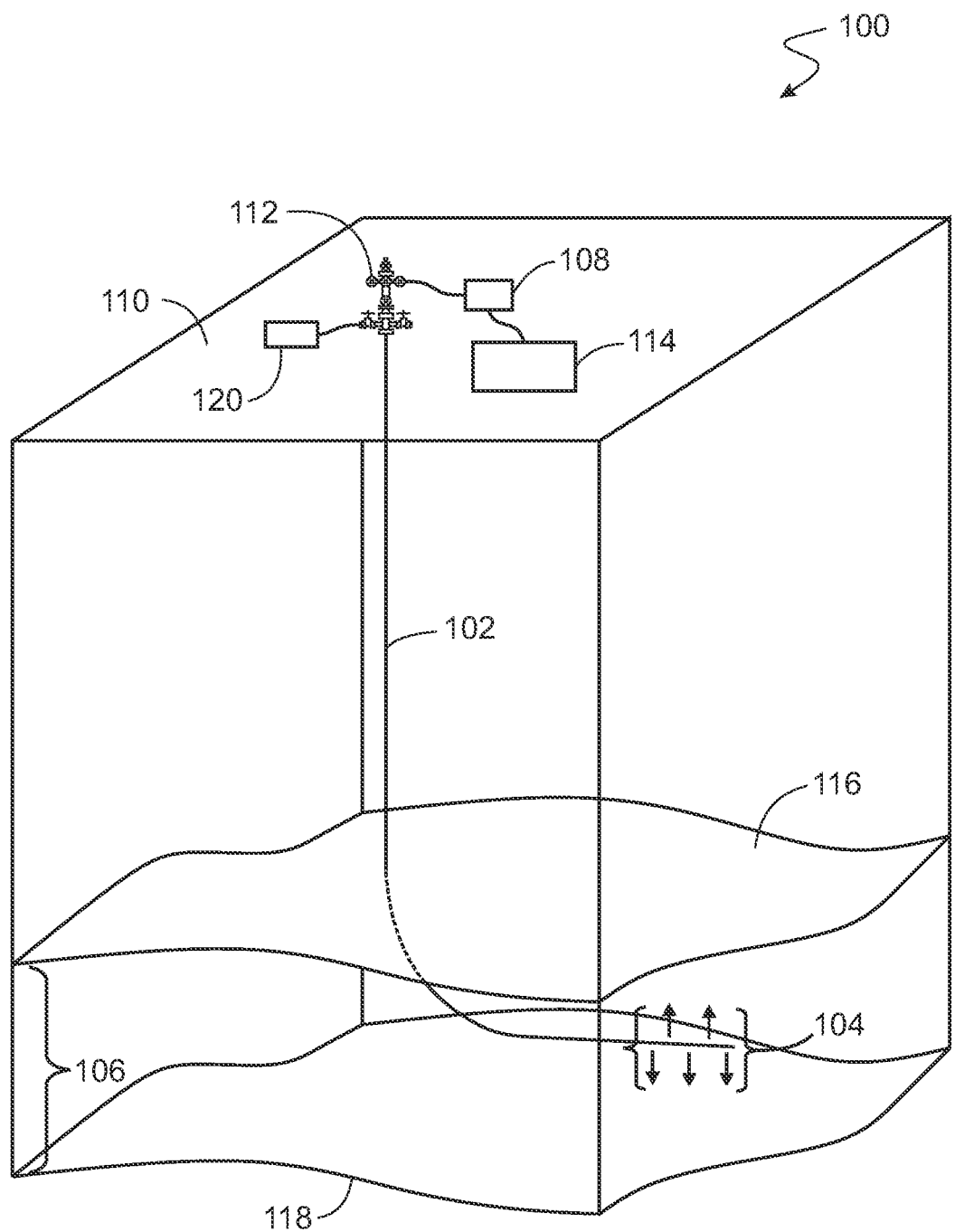
FIG. 1 is a schematic drawing of a wellbore, showing injection of a fluid, such as water into a reservoir layer in a subterranean formation.

FIG. 1 is a schematic drawing 100 of a wellbore 102, showing injection of a fluid, such as water 104 into a reservoir layer 106 in a subterranean formation. The water 104 may be wastewater, produced water, water flooding used for enhanced oil production, or other water streams. Further, the techniques are not limited to water but may be used with other fluids, so long as the fluids have reflectivity for ultrasonic pressure waves. The techniques described herein are not limited to use in injection wells, but may be used in production wells.

In a fluid injection, such as a wastewater injection, a pump 108 located at the surface 110 is coupled to a wellhead 112 to pump water 104 from a tank 114 into the wellbore 102. The water 104 is injected into the reservoir layer 106, for example, formed by a layer of porous rock between an impervious layer of cap rock 116 and a basement rock 118. A falloff test can be used to determine the condition of the reservoir, for example, the injectivity performance, permeability, and pressure of the reservoir.

In the falloff test, the injection from the pump 108 is stopped and the valves at the wellhead 112 are closed. In some embodiments, a pressure measurement system 120 is placed in the wellhead 112 to measure the pressure, and calculate the bottom hole pressure of the wellbore 102 in the reservoir layer 106, for example, based on the total vertical height of the wellbore 102. As described herein, the water level may drop below the pressure sensor in the wellhead 112, causing the pressure to drop to zero, or to pull a vacuum. Accordingly, in some embodiments, the pressure measurements system 120 is configured to utilize a sonic level sensor mounted in the wellhead 112 with the pressure sensor to calculate the level of the fluid below the pressure sensor in the wellhead 112. The level is used to calculate the bottom hole pressure in the wellbore 102, filling in any missing data and allowing the use of sensors in the wellhead 112 without the use of a wireline sensor dropped into the wellbore 102. This will significantly lower the costs of the measurement.

Figure 2A:
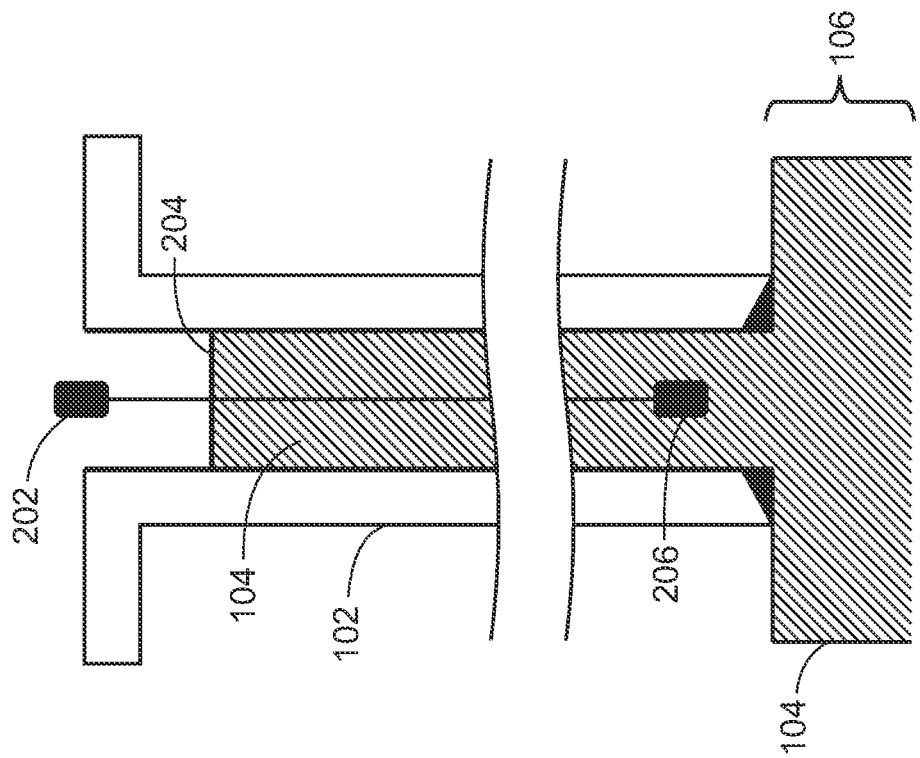
FIGS. 2A and 2B are schematic drawings of a pressure measurement during a falloff test in the wellbore.
Figure 2B:
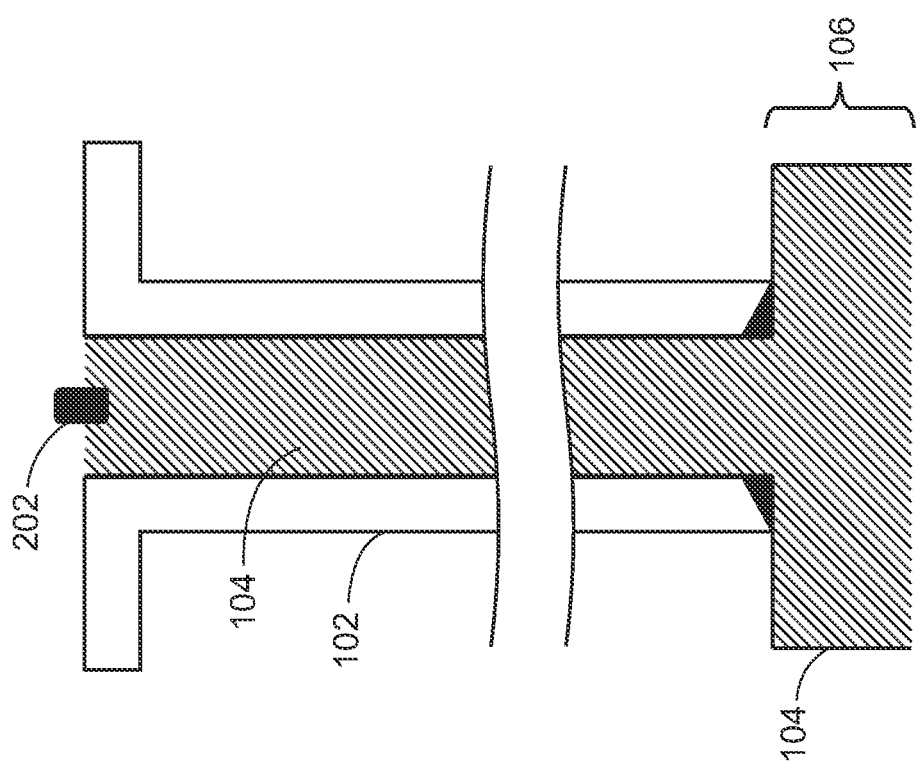

FIGS. 2A and 2B are schematic drawings of a pressure measurement during a falloff test in the wellbore 102. As shown in FIG. 2A, after blocking in the wellbore 102, the pressure is recorded over time using a pressure sensor 202 located at the top of the wellbore 102, for example, in a wellhead 112 (FIG. 1). The reservoir pressure, or bottom hole pressure, can be calculated using Equation 1.

$$P_{reservoir} = P_{wellhead} + BH_{TVD} * PG_{Hydro}$$ Eqn. 1

In Equation 1, $P_{reservoir}$=Bottom Hole Reservoir Pressure (psi), $P_{wellhead}$=Pressure (psi), $BH_{TVD}$=Bottom Wellbore True Reservoir Vertical Depth (ft), and $$PG_{Hydro} = \text{Pressure Gradient of Hydrostatic Column} \left(\frac{\text{psi}}{\text{ft}}\right).$$

However, as shown in FIG. 2B, if the water level 204 drops below the level of the pressure sensor 202, it will read a zero or negative value. This can be solved by use a wireline unit to place a temporary pressure sensor 206 in the wellbore to log pressures at known depths during the fall off test. The pressure values from the temporary pressure sensor 206 can be converted to the reservoir pressure using Equation 2.

$$P_{reservoir} = P_{TPS} + (BH_{TVD} - TPS_{TVD}) * PG_{Hydro} \quad \text{Eqn. 2}$$

In Equation 2, $P_{reservoir}$=Bottom Hole Reservoir Pressure (psi), $P_{TPS}$=Temporary Pressure Sensor Pressure (psi), $BH_{TVD}$=Bottom Wellbore Reservoir True Vertical Depth (ft), $TPS_{TVD}$=Temporary Pressure Sensor True Vertical depth (ft), and $$PG_{Hydro} = \text{Pressure Gradient of Hydrostatic Column} \left(\frac{\text{psi}}{\text{ft}}\right).$$

Although the wireline sensor allows a measurement of the pressure, placement of the temporary sensor adds costs to the measurement.

Figure 3B:
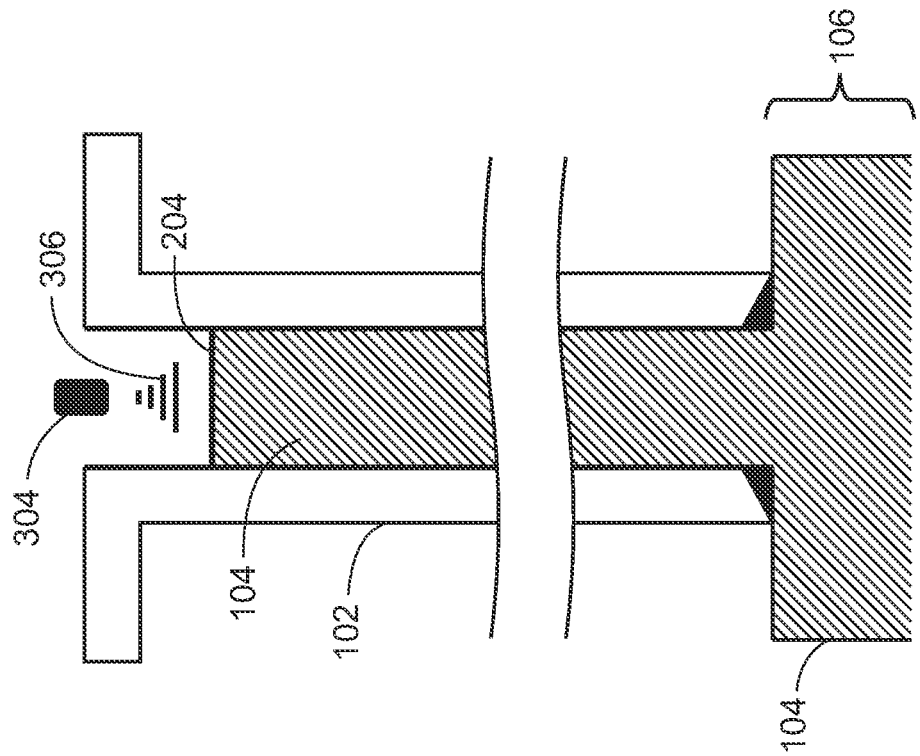
FIGS. 3A and 3B are schematic drawings of a pressure measurement during a falloff test in the wellbore using a pressure sensor and a sonic sensor that are mounted at the top of the wellbore.
Figure 3A:
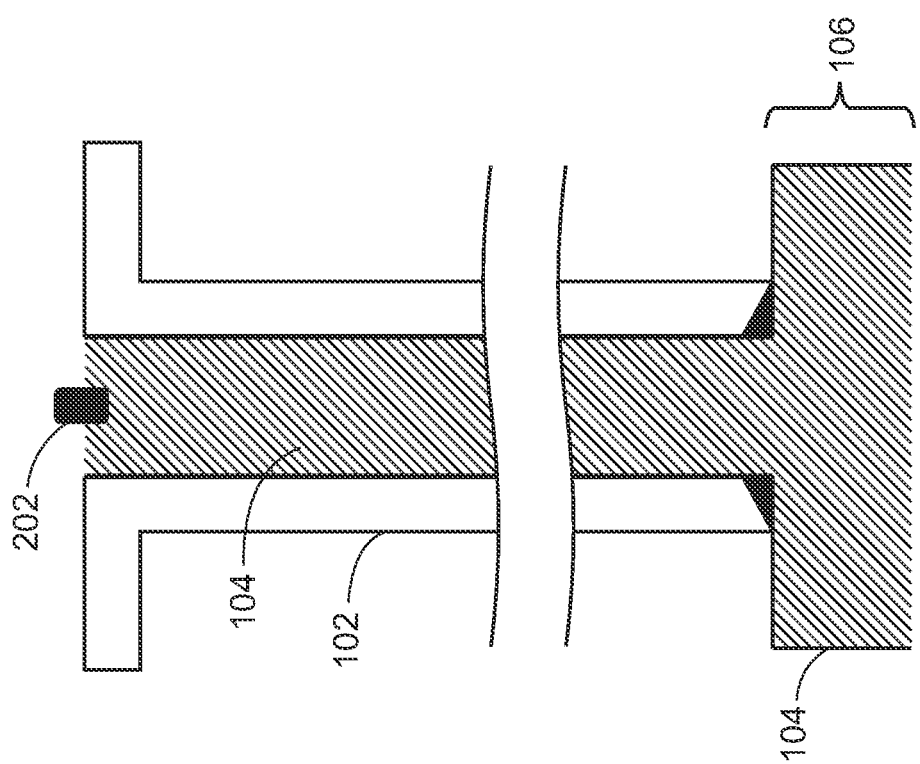

FIGS. 3A and 3B are schematic drawings of a pressure measurement during a falloff test in the wellbore 102 using a pressure sensor 302 and a sonic sensor 304 that are mounted at the top of the wellbore 102. The pressure sensor 302 and the sonic sensor 304 may be a combined The sonic sensor 304 may include any number of sensors, for example, the sensor sensor 304 may be the IRU-3430 from Automation Products Group, INC. from Logan, UT, USA. The pressure sensor 302 may also include any number of sensors, such as a Model 1002/1003 Pressure Transmitter available from GP:50 of Grand Island, NY, USA.

The techniques take advantage of the pressure from the surface gauge ($P_{wellhead}$ in eq.1) and replaces the need for a deep downhole sensor deployment. The pressure sensor 302 and sonic sensor 304 are installed prior to the falloff test and operated throughout the test. After the water falls below the pressure sensor 302, the sonic sensor 304 detects the water level 204 by recording the time it takes for ultrasonic waves 306 emitted from a source in the sonic sensor 304 to reflect from the surface of the water 104 and return to the sonic sensor 304. After recording the depth vs time, Equation 3 can be used to correlate depth with desired pressure.

$$P_{reservoir} = P_{wellhead} + (BH_{TVD} - SL_{TVD}) * PG_{Hydro} \quad \text{Eqn. 3}$$

In Equation 3, $P_{reservoir}$=Bottom Hole Reservoir Pressure (psi), $P_{wellhead}$=Wellhead Pressure (psi), $BH_{TVD}$=Bottom Wellbore True Reservoir Vertical Depth (ft), $SL_{TVD}$=Sonic Log True Vertical depth (ft), and $$PG_{Hydro} = \text{Pressure Gradient of Hydrostatic Column} \left(\frac{\text{psi}}{\text{ft}}\right).$$

Figure 4C:
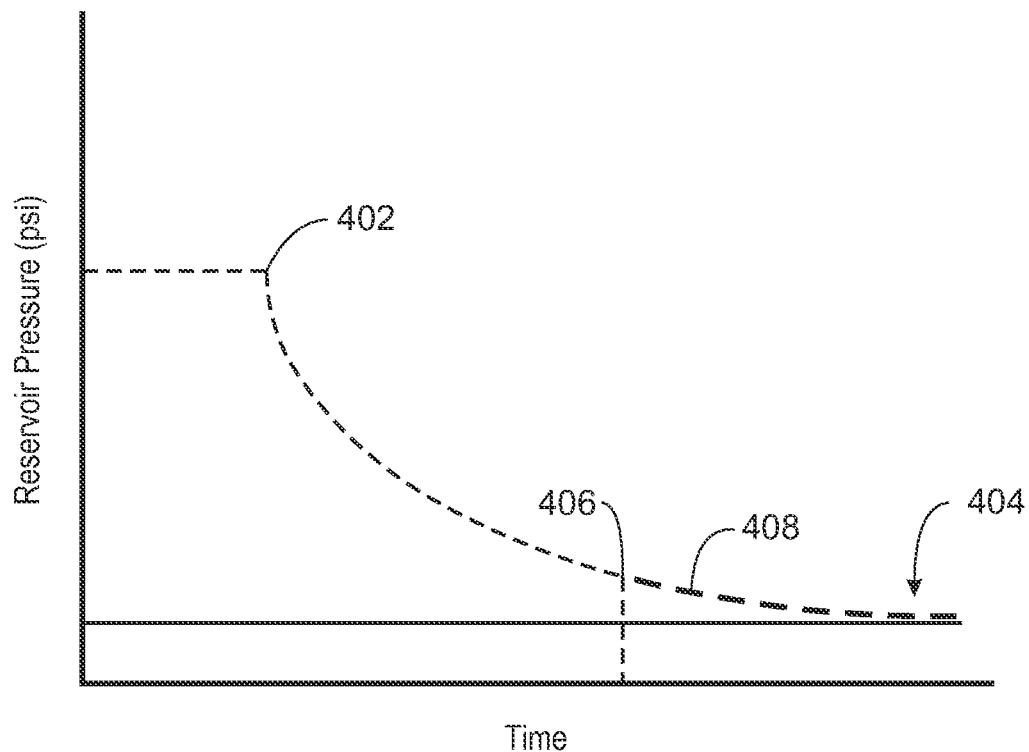

FIGS. 4A-4C are plots of the pressure measurement during a falloff test in the wellbore 102 using data from level measurements to provide a continuous measurement of the reservoir pressure after the liquid level falls below the surface pressure gauge. The test begins 402 when the wellbore is shut in, allowing the pressure to fall. As shown in FIG. 4A, the pressure in the wellbore will fall off over time, and the completion 404 of the test may be determined by, for example, values that are not significantly changing between subsequent measurements, or a period of time over which the pressure is not changing significantly.

The calculated pressure from Equation 1, after the falloff test is completed, can be seen in FIG. 4A where the curve is continuous as long as the water is above the sensors. However, as shown in FIG. 4B, the liquid level in the wellbore may drop below the pressure sensor 202 (FIGS. 2A and 2B), allowing the pressure to drop 406 to zero or below. In this case, a complete set of data is not generated for the pressure values, leaving a gap in the data.

As shown in FIG. 4C, the proposed sonic sensor eliminates the water level limitation and fills in the data 408 in the gap through calculation of the pressure values from levels determined by the sonic sensor using Equation 3. The overlap between the pressure from the pressure sensor and the calculated pressure from the sonic sensor can be utilized to produce a continuous pressure vs time curve, and allowing the test to be taken to completion 404.

Figure 5:
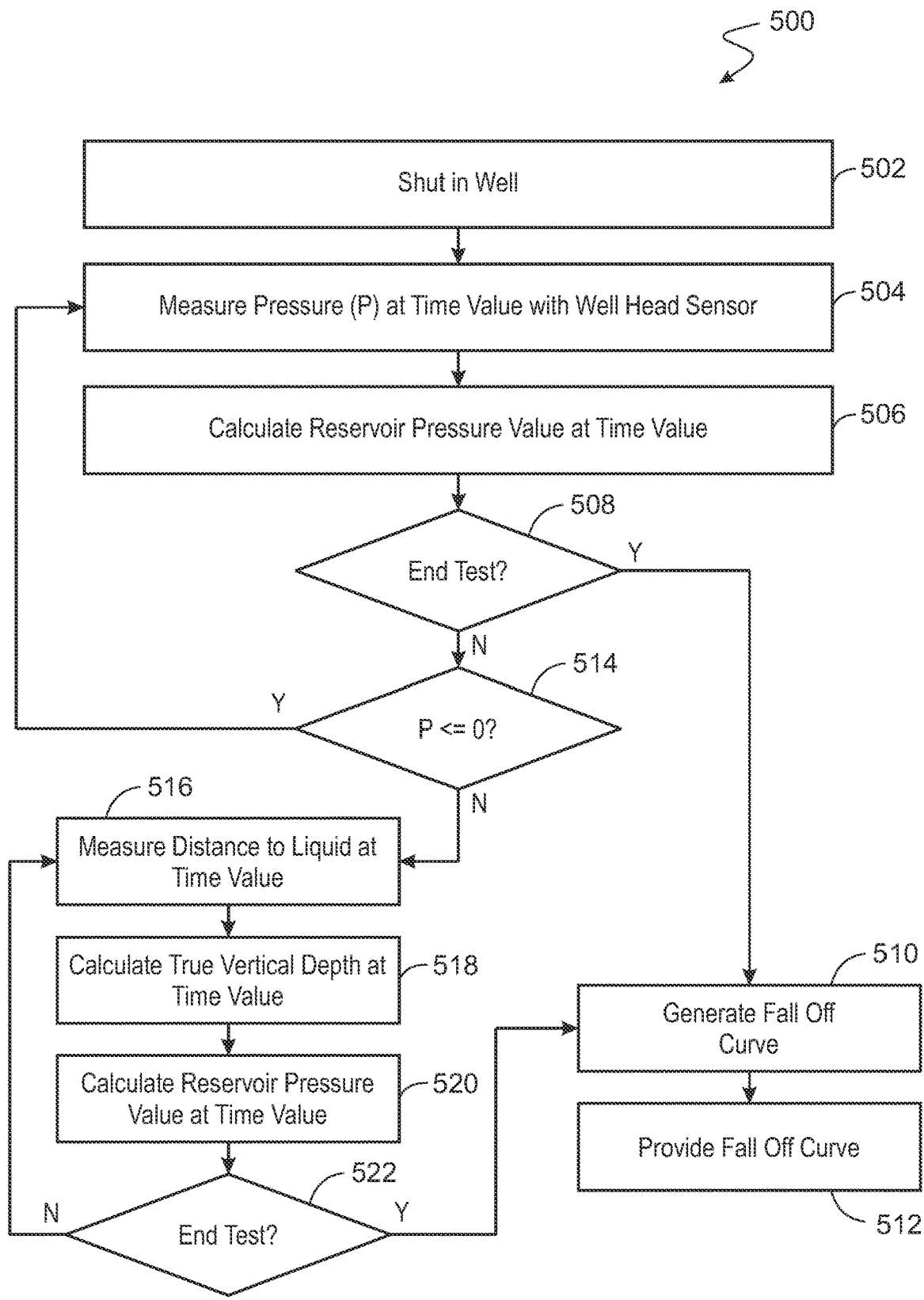
FIG. 5 is a process flow diagram of a method for measuring pressure during a falloff test.

FIG. 5 is a process flow diagram of a method 500 for measuring pressure during a falloff test. The method begins at block 502, when the wellbore is shut in. At block 504, the pressure is measured at a time value using the pressure sensor in the wellhead. At block 506, the reservoir pressure at the time value is calculated, for example, using Equation 1.

At block 508, a determination is made as to whether the test is completed. For example, this may be the point at which the change between sequential reservoir pressure values is less than a predetermined amount, for example, less than 0.1%, 0.25%, 0.5%, 1%, or higher, depending on the accuracy of the test. If the determination is made at block 508 that the test has ended, the process flow moves to block 510. If not, process flow returns to block 504 to measure the next pressure value at a subsequent time value.

At block 510, the falloff curve is generated by plotting the reservoir pressure values over the time values. At block 512, the falloff curve is provided, for example, on a display for a user, in a printed report, and the like. In some embodiments, the falloff curve is continuously displayed during the falloff test.

If the determination is made at block 508 that the test has not ended, the process flow moves to block 514. At block 514, a determination is made as to whether the pressure has dropped to or below zero, indicating that the liquid level has dropped below the pressure sensor. If so, process flow moves to block 516.

At block 516, the distance to the liquid from the location of the pressure sensor and sonic sensor is measured at a time value. At block 518, the distance is used to calculate a true vertical depth at the time value. At block 520, the reservoir pressure is calculated at the time value from the true vertical depth, for example, using Equation 3.

At block 522, a determination is made as to whether the test has ended. This may be performed using the same procedure as described with respect to block 508. If so, process flow proceeds to block 510 to complete the test. If not, process flow returns to block 516 to continue with the measurements of the liquid level.

Figure 6:
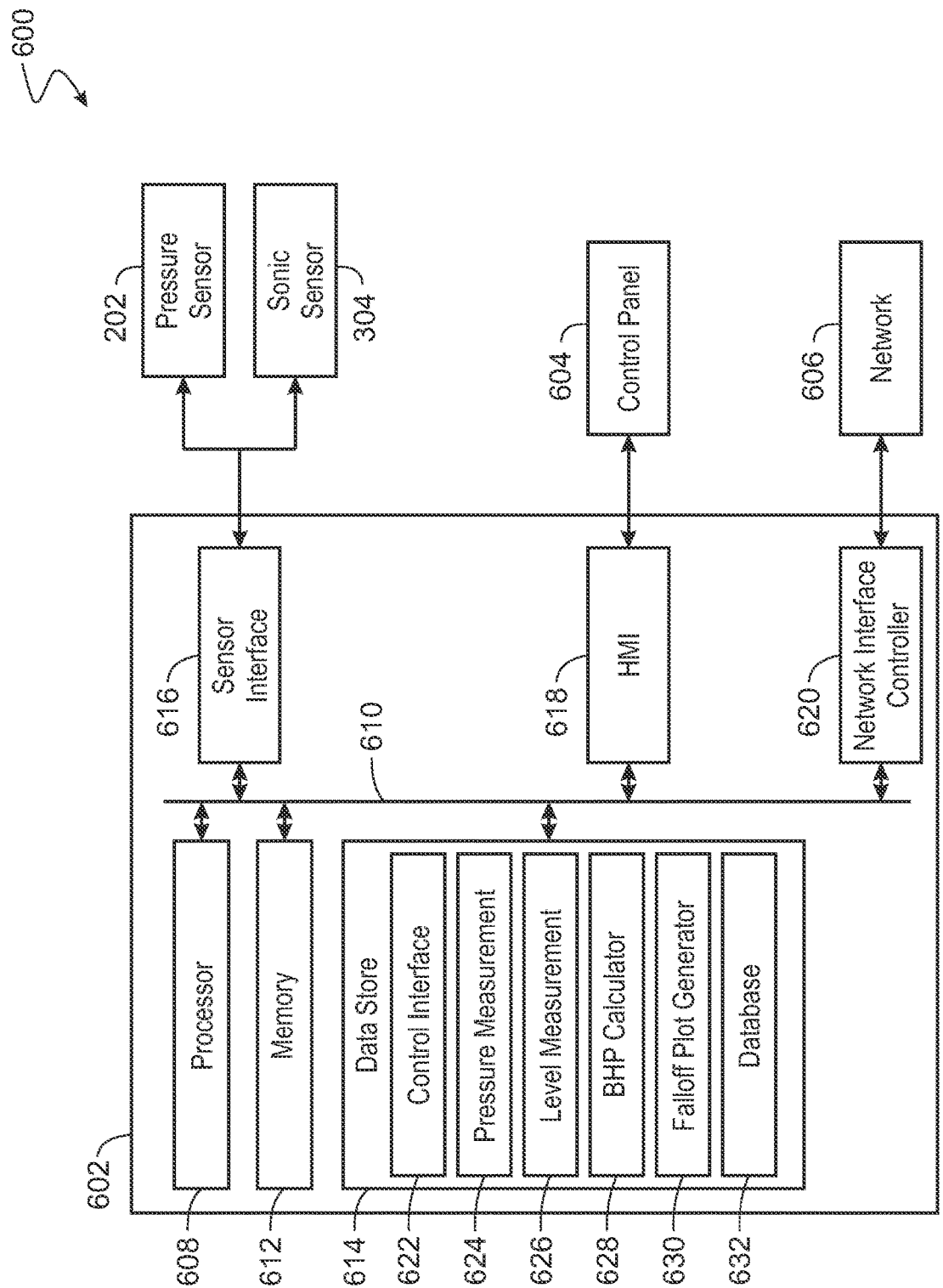
FIG. 6 is a block diagram of a system for calculating reservoir pressure during a falloff test.

FIG. 6 is a block diagram of a system 600 for calculating reservoir pressure during a falloff test. As described herein, the system 600 includes a controller 602, a pressure sensor 202, a sonic sensor 304, a control panel 604, and a network 606. Like numbered items are as described with respect to FIGS. 2 and 3.

The controller 602 includes a processor 608. The processor 608 may be a microprocessor, a multi-core processor, a multithreaded processor, an ultra-low-voltage processor, or an embedded processor. In some embodiments, the processor 608 may be part of a system-on-a-chip (SoC) in which the processor 608 and the other components of the controller 602 are formed into a single integrated electronics package. In various embodiments, the processor 608 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used.

The processor 608 may communicate with other components of the controller 602 over a bus 610. The bus 610 may include any number of technologies, such as industry standard architecture (ISA), extended ISA (EISA), peripheral component interconnect (PCI), peripheral component interconnect extended (PCIx), PCI express (PCIe), or any number of other technologies. The bus 610 may be a proprietary bus, for example, used in an SoC based system. Other bus technologies may be used, in addition to, or instead of, the technologies above.

The bus 610 couples the processor 608 to a memory 612. In some embodiments, such as in PLCs and other process control units, the memory 612 is integrated with a data store 614 used for long-term storage of programs and data. The memory 612 includes any number of volatile and nonvolatile memory devices, such as volatile random-access memory (RAM), static random-access memory (SRAM), flash memory, and the like. In smaller devices, such as PLCs, the memory 612 may include registers associated with the processor itself. The data store 614 is used for the persistent storage of information, such as data, applications, operating systems, and so forth. The data store 614 may be a nonvolatile RAM, a solid-state disk drive, a flash drive, or a hard disk drive, such as a micro hard disk drive, among others. In some embodiments, the data store 614 will include a flash drive.

The bus 610 couples the processor 608 to a sensor interface 616. The sensor interface 616 connects the controller 602 to the sensors used to implement the functions of the system 600. In some embodiments, the sensor interface 616 is a bank of analog-to-digital converters (ADCs), an I2C bus, or a serial peripheral interface (SPI) bus, and the like. As described above, the sensors may include a pressure sensor 202, and a sonic sensor 304.

The bus 610 couples the processor 608 to a human-machine interface (HMI) 618, which is used to couple the controller 602 to the control panel 604. In some embodiments, the HMI 618 is a serial bus, such as a serial peripheral interface (SPI), or a universal serial bus (USB), among others. In other embodiments, the HMI 618 includes a display driver and display memory as well as a keyboard scanner. The control panel 604 generally includes a display, such as an LCD display, for displaying measurements, and a keypad, such as a numerical keypad or keyboard, for data and control entry. In some embodiments, the control panel 604 is a touch screen with programmable regions that can be configured as buttons, for example, during different operations.

In some embodiments, the bus 610 couples the processor 608 to a network interface controller (NIC) 620. The NIC 620 may be an Ethernet controller or may include radio systems to implement a wireless network. The NIC 620 couples the controller 602 to a network, for example, as part of a drilling control system. The network includes functionality to provide the falloff curve to a user, for example, on a display screen on a control terminal, or in a printed report, among others.

The data store 614 includes blocks of stored instructions that, when executed, direct the processor 608 to implement the functions of the system 600. For example, the data store 614 includes a block 622 of instructions that implement the control interface of the system 600, such as starting the test and providing the falloff curve. For example, the control interface instructions of block 622 accepts a test start indication from the user, for example, when the wellbore is blocked in, and starts collecting values for the pressure at corresponding time values through block 624. The instructions at block 622 also direct the processor to provide the falloff curve, for example, on a continuous basis throughout the falloff test.

The data store 614 includes the block 624 of instructions to direct the processor 608 to collect the pressure measurement from the pressure sensor. For example, at a preset time increments, a value for the pressure is collected from the pressure sensor. The block 624 also includes instructions to direct the processor 608 to move to block 626 for collecting level measurements from the sonic sensor if the value of the pressure drops to zero. In some cases, both blocks 624 and 626 are continuously operating, and block 622 controls the recording and display of data.

The data store 614 includes a block 628 of instructions that direct the processor 608 to calculate the bottom hole pressure from the data collected from blocks 624 and 626. For example, when the pressure from the pressure sensor at the surface is above zero the data from block 624 is used in Equations 1 and 2 to calculate the bottom hole pressure from the pressure measurement. If the pressure drops to or below the instructions of block 628 direct the processor to calculate the bottom hole pressure from the level measurements collected at block 626, for example, using Equation 3.

The data store 614 includes a block of instructions 630 to generate the falloff curve from the test data. The instructions of block 622 provide the curve to a user, for example, displaying the curve on the display of the control panel 604 or a display or printer coupled to the network 606.

In some embodiments, the data store 614 includes a database 632 that stores historical data for falloff tests from the system 600. The database 632 may also be used to store data collected by block 624 and 626 for use by the bottom hole calculation of the instructions in block 628.

EMBODIMENTS

An embodiment described in examples herein provides a method for determining reservoir pressure in a wellbore during a falloff test. The method includes shutting in a wellbore, measuring pressure versus time using a wellhead sensor, calculating a reservoir pressure versus time from the measured pressure, and determining if the measured pressure has dropped to zero. If the measured pressure has dropped to zero, measuring distance from the wellhead sensor to a liquid level versus time, calculating a vertical depth versus time from the distance versus time, and calculating the reservoir pressure versus time based, at least in part, on the distance and the vertical depth of the well. The method also includes creating a falloff curve from the reservoir pressure versus time and providing the falloff curve.

In an aspect, the method includes mounting the wellhead sensor in the wellhead. In an aspect, the wellhead sensor includes a pressure sensor and a sonic sensor disposed at a same level in a wellbore.

In an aspect, shutting in the wellbore includes stopping an injection of water into the well, and closing valves on the wellhead.

In an aspect, the method includes measuring distance from the wellhead sensor to the liquid level by measuring an amount of time ultrasonic waves from a source in the wellhead sensor take to reflect from the liquid level and return to a detector in the wellhead sensor.

In an aspect, the method includes ending the falloff test when a change between a reservoir pressure value and a preceding reservoir pressure value is less than a predetermined amount.

In an aspect, the method includes ending the test after a preset time.

In an aspect, the method includes calculating the reservoir pressure ($P_{reservoir}$) from the pressure using the equation:

$$P_{reservoir} = P_{wellhead} BH_{TVD} * PG_{Hydro},$$

wherein $P_{reservoir}$=Bottom Hole Reservoir Pressure (psi), $P_{wellhead}$=Wellhead Pressure (psi), $BH_{TVD}$=Bottom Wellbore True Reservoir Vertical Depth (ft), and $$PG_{Hydro} = \text{Pressure Gradient of Hydrostatic Column} \left(\frac{psi}{ft}\right).$$

In an aspect, the method includes calculating the reservoir pressure ($P_{reservoir}$) from the level and pressure using the equation:

$$P_{reservoir} = P_{wellhead} + (BH_{TVD} - SL_{TVD}) * PG_{Hydro},$$

wherein $P_{reservoir}$=Bottom Hole Reservoir Pressure (psi), $P_{wellhead}$=Wellhead Pressure (psi), $BH_{TVD}$=Bottom Wellbore True Reservoir Vertical Depth (ft), $SL_{TVD}$=Sonic Log True Vertical depth (ft), and $$PG_{Hydro} = \text{Pressure Gradient of Hydrostatic Column} \left(\frac{psi}{ft}\right).$$

In an aspect, the method includes providing the falloff curve by displaying the falloff curve on a display after completion of the falloff test. In an aspect, the method includes providing the falloff curve by including the falloff curve in a printed report. In an aspect, the method includes providing the falloff curve by displaying the falloff curve on a display continuously during the falloff test.

Another embodiment described in examples herein provides a system for measuring pressure in a wellbore during a falloff test. The system includes a pressure sensor disposed at a surface in a wellbore, a sonic sensor disposed at the surface in the wellbore proximate to the pressure sensor, and a controller. The controller includes a sensor interface to couple the controller to the pressure sensor and the sonic sensor, a processor, and a data store. The data store includes instructions to direct the processor to measure the pressure from the pressure sensor, measure a level of fluid in the wellbore using the sonic sensor, calculate the reservoir pressure using the pressure, or the pressure and the level, generate a falloff plot, and provide the falloff plot.

In an aspect, the system includes a control panel, wherein the controller includes a human-machine interface coupling a control panel to the processor, and wherein the data store includes instructions to direct the processor to display the falloff plot on the control panel. In an aspect, the controller includes a network interface controller coupling the control panel to a network, wherein the data store includes instructions to direct the processor to provide the falloff plot to the network for display on a unit coupled to the network.

In an aspect, the data store includes instructions to direct the processor to start data collection for the falloff test.

In an aspect, the data store includes a database, wherein the database includes pressure measurements, level measurements, or both versus time. In an aspect, the data store includes a database, wherein the database includes reservoir pressure values versus time.

Other implementations are also within the scope of the following claims.

What is claimed is:

1. A method for determining reservoir pressure in a wellbore during a falloff test, comprising:
   shutting in a wellbore;
   measuring pressure versus time using a wellhead sensor;
   calculating a reservoir pressure versus time from the measured pressure;
   determining that the measured pressure has dropped to zero;
   in response to determining that the measured pressure has dropped to zero:
   measuring distance from the wellhead sensor to a liquid level versus time;
   calculating a vertical depth versus time from the distance versus time; and
   calculating the reservoir pressure versus time based, at least in part, on the distance and the vertical depth of the well;
   creating a falloff curve from the reservoir pressure versus time; and
   providing the falloff curve.

2. The method of claim 1, comprising mounting the wellhead sensor in the wellhead.

3. The method of claim 1, wherein the wellhead sensor comprises a pressure sensor and a sonic sensor disposed at a same level in a wellbore.

4. The method of claim 1, wherein shutting in the wellbore comprises:
   stopping an injection of water into the well; and
   closing valves on the wellhead.

5. The method of claim 1, comprising measuring distance from the wellhead sensor to the liquid level by measuring an amount of time ultrasonic waves from a source in the wellhead sensor take to reflect from the liquid level and return to a detector in the wellhead sensor.

6. The method of claim 1, comprising ending the falloff test when a change between a reservoir pressure value and a preceding reservoir pressure value is less than a predetermined amount.

7. The method of claim 1, comprising ending the test after a preset time.

8. The method of claim 1, comprising calculating the reservoir pressure ($P_{reservoir}$) from the pressure using the equation:

$$P_{reservoir} = P_{wellhead} + BH_{TVD} * PG_{Hydro},$$

wherein $P_{reservoir}$=Bottom Hole Reservoir Pressure (psi), $P_{wellhead}$=Wellhead Pressure (psi), $BH_{HTVD}$=Bottom Wellbore True Reservoir Vertical Depth (ft), and $$PG_{Hydro} = \text{Pressure Gradient of Hydrostatic Column} \left(\frac{\text{psi}}{\text{ft}}\right).$$

9. The method of claim 1, comprising calculating the reservoir pressure ($P_{reservoir}$) from the level and pressure using the equation:

$$P_{reservoir} = P_{wellhead} + (BH_{TVD} - SL_{TVD}) * PG_{Hydro},$$

wherein $P_{reservoir}$=Bottom Hole Reservoir Pressure (psi), $P_{wellhead}$=Wellhead Pressure (psi), $BH_{TVD}$=Bottom Wellbore True Reservoir Vertical Depth (ft), $SL_{TVD}$=Sonic Log True Vertical depth (ft), and $$PG_{Hydro} = \text{Pressure Gradient of Hydrostatic Column} \left(\frac{\text{psi}}{\text{ft}}\right).$$

10. The method of claim 1, comprising providing the falloff curve by displaying the falloff curve on a display after completion of the falloff test.

11. The method of claim 1, comprising providing the falloff curve by including the falloff curve in a printed report.

12. The method of claim 1, comprising providing the falloff curve by displaying the falloff curve on a display continuously during the falloff test.

13. A system for measuring pressure in a wellbore during a falloff test, comprising:
   a pressure sensor disposed at a surface in a wellbore;
   a sonic sensor disposed at the surface in the wellbore proximate to the pressure sensor;
   a controller comprising:
      a sensor interface to couple the controller to the pressure sensor and the sonic sensor;
      a processor; and
      a data store, wherein the data store comprises instructions to direct the processor to:
         measure the pressure from the pressure sensor;
         measure a level of fluid in the wellbore using the sonic sensor;
         calculate the reservoir pressure using the pressure;
         determine that the pressure has dropped to zero;
         in response to determining that the pressure has dropped to zero:
            measure distance from the sonic sensor to the level of fluid;
            calculate a vertical depth of the wellbore based on the distance; and
            calculate the reservoir pressure based on the distance and the vertical depth;
         generate a falloff plot; and
         provide the falloff plot.

14. The system of claim 13, comprising a control panel, wherein the controller comprises a human-machine interface coupling a control panel to the processor, and wherein the data store comprises instructions to direct the processor to display the falloff plot on the control panel.

15. The system of claim 13, wherein the controller comprises a network interface controller coupling the control panel to a network, and wherein the data store comprises instructions to direct the processor to provide the falloff plot to the network for display on a unit coupled to the network.

16. The system of claim 13, wherein the data store comprises instructions to direct the processor to start data collection for the falloff test.

17. The system of claim 13, wherein the data store comprises a database, and wherein the database comprises pressure measurements, level measurements, or both versus time.

18. The system of claim 13, wherein the data store comprises a database, and wherein the database comprises reservoir pressure values versus time.

\* \* \* \* \*